July 20, 1965  G. LEMESLE ETAL  3,196,082

FUEL LOADING AND UNLOADING ARRANGEMENT FOR NUCLEAR REACTORS

Filed Feb. 12, 1963

United States Patent Office 3,196,082
Patented July 20, 1965

3,196,082
FUEL LOADING AND UNLOADING ARRANGE-
MENT FOR NUCLEAR REACTORS
Georges Lemesle, Roger Martin, and Marcel Monteil,
Paris, Roland Roche, Clamart, and Pierre Rouge, Gif-
sur-Yvette, France, assignors to Commissariat a l'Ener-
gie Atomique, Paris, France
Filed Feb. 12, 1963, Ser. No. 257,894
Claims priority, application France, Feb. 20, 1962,
888,608
12 Claims. (Cl. 176—30)

This invention relates to nuclear reactors of the type in which the nuclear fuel is contained in parallel spaced fuel channels formed in the core of the reactor, usually in the form of cylindrical fuel elements or cartridges stacked in each channel, and the fuel channels are adapted to be serviced, as for removing spent fuel and inserting fresh fuel out of and into the channels, by means of a handling unit arranged in a servicing chamber provided adjacent one end of the reactor core and communicating with corresponding ends of all the channels, which unit is positionable in the chamber in servicing relation to any selected channel. Usually the fuel channels are vertical, and the servicing chamber is arranged above or below the reactor core so that the handling unit services the channels from their upper or lower ends.

The reactor core is surrounded with a heavy concrete shield for biological protection and also serving as a pressure vessel for the coolant gas under pressure, such as carbon dioxide, which is generally circulated through the fuel channels and around the core to cool the fuel. Fresh fuel must be introduced into the servicing chamber and spent fuel discharged from it through one or more passages tunnelled through the shield. Formerly, a typical fueling cycle would involve the following operations: positioning a handling unit in servicing relation to a channel in the servicing chamber; operating the unit to extract spent fuel from the channel; move the unit out of the chamber through the passage for unloading the spent fuel at an unloading-loading station; loading the same or another handling unit with fresh fuel at said station; moving it through the passage into the chamber; positioning it in servicing relation to a channel; inserting the fresh fuel into the channel; and so on.

One way of greatly expediting this fueling cycle is to provide the handling unit with sufficient capacity to hold both a full complement of fresh fuel and a full complement of spent fuel corresponding to the contents of at least one fuel channel, so that the unit can be operated when in servicing position to effect an exchange of the spent fuel in the channel being serviced for fresh fuel without displacing the unit and thus save a complete round trip in the above-described cycle. Another desirable feature is to keep the handling unit permanently within the servicing chamber and to provide separate fuel conveying means between the servicing chamber and the loading-unloading station through the passage. An advantage of this latter feature, additional to the increased flexibility in the fueling cycle it permits, is to reduce radioactive contamination of equipment situated outside the reactor shield from the handling unit, since the latter does not leave the interior of the shield. An additional improvement is to reduce as far as possible the radioactivity within the servicing chamber, and this can be done in two ways: first, separating the servicing chamber from the main chamber in which the reactor core is placed by a heavy concrete slab or cap, formed with pluggable ducts for communication between the reactor fuel channels and the servicing chamber for refueling purposes; and secondly, maintaining a substantial over-pressure of coolant gas in the servicing chamber as compared to the main reactor core chamber, so that gas leakage will occur from the servicing chamber into the main chamber, not the reverse, and supplying clean make-up gas into the servicing chamber.

A further improvement in the above fueling arrangements lies in the provision of intermediate fuel storage means in the servicing chamber, for maintaining a store of fuel between the means conveying the fuel through the passage, and the handling unit in the servicing chamber. One important advantage of such intermediate storage is to enable the handling unit and the conveying means to be operated entirely independently from one another and simultaneously, thereby greatly expediting the rate of fueling operations and/or reducing the equipment required. This advantage is especially marked in cases where the servicing chamber is filled with pressure gas, so that a pressure lock is necessary in the fueling passage or tunnel. Another important advantage accompanying the provision of the intermediate storage means is that it makes it possible to store spent fuel, discharged from a fuel channel, in the servicing chamber for a time sufficient to cause a substantial amount of its radioactivity to dissipate and heat production rate of decay to dissipate within said chamber, thereby greatly facilitating subsequent processing of the spent fuel and eliminating the requirement for further decontaminating and cooling equipment.

Objects of this invention are to provide all or part of the above improvements and advantages in a nuclear reactor installation of the type described. Broader objects are to expedite and facilitate fuelling operations in a nuclear reactor as well as general servicing and maintenance operations, both routine and emergency; to reduce and simplify the necessary equipment; to increase the safety factor in such operations. Other specific objects will appear.

In accordance with an important aspect of the invention, there is provided a nuclear reactor comprising a core with parallel spaced fuel channels therein; a shield surrounding the core; a servicing chamber defined in the shield and means providing communication for fuel between said chamber and corresponding ends of said channels; a fuel handling unit in said chamber and means for positioning the unit in servicing relation to a selected channel for insertion and withdrawal of fresh and spent nuclear fuel into and out of said channel; means for conveying fresh and spent fuel into and out of said chamber through the shield; intermediate storage means in the servicing chamber; means for transferring fresh and spent fuel between said conveying means and said storage means; and means on said handling unit for transferring fresh and spent fuel between said unit and said storage means.

An exemplary embodiment of the invention will now be described for purposes of illustration but not of limitation with reference to the accompanying drawings, wherein.

Figure 1:
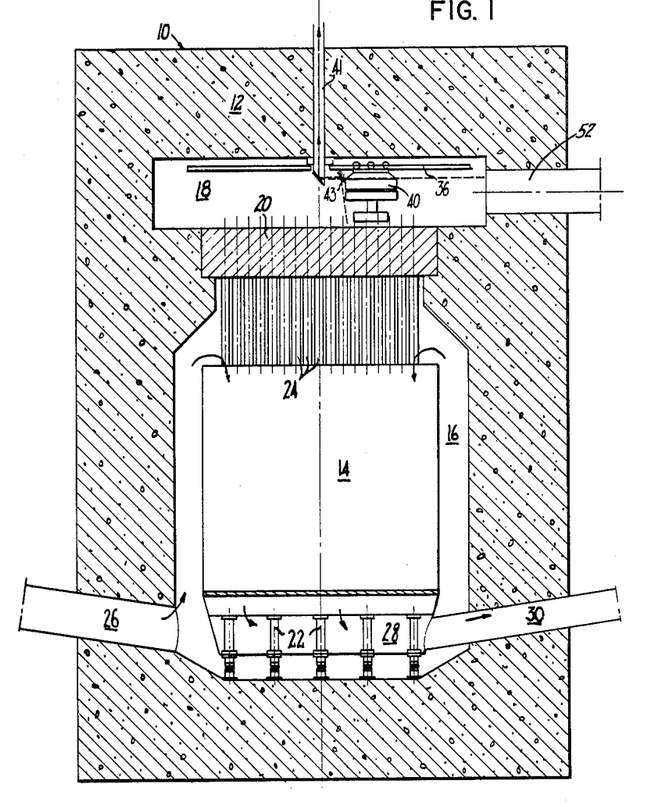
FIG. 1 is a simplified view in vertical section showing a nuclear reactor installation embodying the improved fuelling and servicing means of the invention.

A gas-cooled, solid moderator reactor structure shown in FIG. 1 and generally designated 10 comprises an outer shield 12 made of prestressed concrete which simultaneously serves as a biological protector and a pressure-vessel withstanding the pressure of the gaseous coolant, such as carbon dioxide, flowing through the reactor as presently described. The gas pressure may be of the order of 25 kg./cm.$^2$, and the shield 12 is provided with an internal lining impervious to the pressure gas. Defined within the concrete shield 10 is a main, lower chamber 16 in which the cylindrical core 14 of the reactor is supported on legs 22 with the wall of the core being spaced from the inner wall surface of the chamber 16. Some distance above main chamber 16 of the shield 12 defines an upper servicing chamber 18, of shallower vertical depth, sometimes called the "garret," Upper chamber 18 is separated from the main chamber 16 by a concrete cap or slab 20. The reactor core 14, shown herein in external outline only, may be of conventional internal construction, comprising a stack of graphite bars formed with spaced vertical channels in which stacks or trains of nuclear fuel cartridges are disposed, so as to have their outer surfaces swept by the streams of cooling gas flowing through the channels as later described. Extending from the top of core 14 are charging ducts or tubes 24, aligned with the respective fuel channels, and extending through apertures formed in the concrete cap 20. The charge ducts 24 are fitted with plugs, not shown, for limiting the transfer of cooling gas between the chambers 16 and 18.

The cooling gas system includes external heat exchange means, not shown, from which the cooled gas flows into the base of main chamber 14 through a side inlet conduit 26 passing through the shield 12. The gas rises up through the annular space between the core 14 and chamber walls as indicated by the arrows, then enters the upper ends of the fuel channels and flows down the channels sweeping past the trains of fuel elements therein, cooling them. The heated gas passes into an outlet manifold or collector chamber 28 under the bottom of the core and flows out of the reactor through outlet conduit 30. Suitable pumping means, not shown, are provided to maintain the circulation described. The direction of gas flow may be reversed from that described and indicated by the arrows, if and when desired.

Fresh make-up gas, derived from suitable regenerator and cooling devices not shown, is supplied into the garret or servicing chamber 18 through a conduit not shown, and a slight over-pressure, of the order say of a few tens of grams per cm.$^2$, is maintained in the servicing chamber so as to ensure that leakage flow between the chambers will occur in a downward direction only, and thus prevent radioactive contamination of the equipment in the servicing chamber with gas irradiated in the core. The over-pressure in the upper chamber and the total leakage flow section through cap 20 should be so predetermined with regard to the total number of charge ducts 24 that the unplugging of a charge duct during fuelling operations will not produce more than a slight relative change in the overall rate of gas leakage from the upper into the lower chamber.

The general arrangement of the reactor as so far described is similar to that disclosed in our co-pending United States patent application Serial No. 257,893, filed February 12, 1963, to which reference may be had for greater details. The fuelling equipment according to the present invention, generally associated with the upper chamber 18, will now be described with reference to FIGS. 2–11.

Extending from the side wall of cylindrical servicing chamber 18 in angularly equispaced relation are three fuelling passages or tunnels, each containing fuel input-output conveyor equipment for introduction and discharge of fresh and spent fuel cartridges into and out of the servicing chamber 18. The three passages and their contents are identical, and only one will be described with reference to FIGS. 2 and 3. The fuelling passage, generally designated 52, is defined by a generally cylindrical casing or shell extending in part through a tunnel formed in the shield 12 and in part through an enlarged chamber formed in an auxiliary shield section 58 adjacent to the main shield 12. At its outer end the passage 52 connects with an elevator shaft 60. The passage contains an input-output conveyor system, generally designated A, for conveying cartridge magazines 50 between the elevator and an intermediate storage system, generally designated B, provided in the servicing chamber. Within the servicing chamber is a fuel handling system C, serving to transfer the fuel cartridges 50 between the intermediate storage system B and any selected fuel channel of the reactor. The three systems will be described in a general way in the order C, B, A.

The handling system C comprises a polar-coordinate positioner 32 consisting of three arms provided with monorail tracks 36 and independently rotatable about a central overhead pivot 34 in the chamber 18, and guided in their rotational displacements by a circular runway 38. An annular rack fixed to runway 38 meshes with a gear secured on the shaft of an electric motor 39 supported by each arm, so that actuation of the motor 39 makes it possible to impart a desired angular setting to each of the three arms. Supported on the track 36 of each of the arms for radial displacement along it is a fuelling machine or fuel-handling unit 40 illustrated separately in FIGS. 8 and 9. It will be understood that the combination of angular movement imparted to the arms and radial displacements imparted to the handling units 40 along said arms makes it possible to bring a handling unit to an operative position overlaying any selected one of the charge ducts 24, so as to service a selected fuel channel therethrough. While the polar-coordinate positioner or scanning system thus described is especially convenient in view of the generally cylindrical form of the reactor core and chambers in the example, other scanning systems, based on rectangular coordinates, may be used where occasion demands.

For monitoring the fuel handling operations visually when desired to do so, there is provided a normally plugged vertical axial passage 41 extending upwardly from servicing chamber 18 and through which a periscope attachment can be introduced. A set of television cameras and suitable illuminating means may be further provided in said chamber. The handling unit 40 is shown as supporting an optical system including a mirror 43 cooperating optically with the periscope mirror at the lower end of the passage 41.

Figure 2:
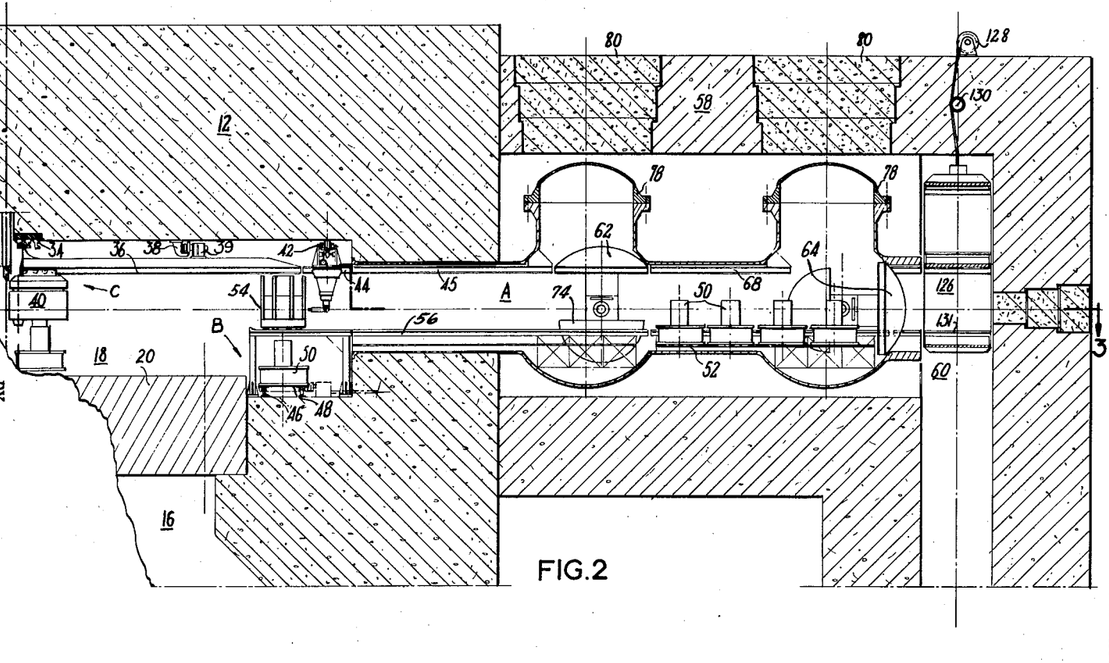
FIG. 2 is a larger-scale view, in vertical section on line 2—2 of FIG. 3, showing the upper right-hand part of the reactor of FIG. 1, as well as one of three fuelling tunnels and related apparatus associated with the servicing chamber of the reactor.

Extending along the longitudinal midline of each of the three fuelling passages 52 is an overhead monorail track 45 (see FIG. 2). A continuous junction can be established from each of the monorail tracks 45 to a related one of the three revolving tracks 36 by way of a radial track segment 44 supported on a carrier displaceable along a circumferential overhead rail 42 supported near the periphery of chamber 18. This arrangement is used for servicing the handling units 40 through the fuelling passages 52 for purposes of maintenance and repairs as will later become clear.

Figure 3:
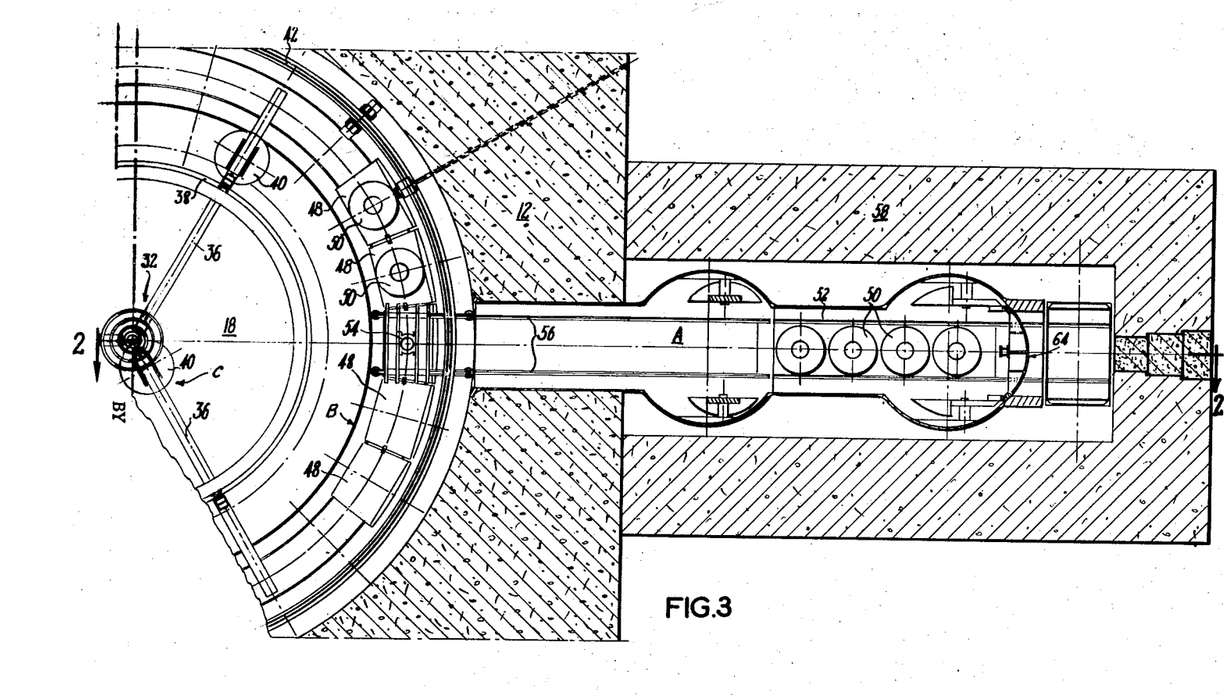
FIG. 3 is a horizontal view of FIG. 2, in section on line 3—3 of that figure.

The intermediate storage system B comprises a continuous circular track 46 arranged on the floor of chamber 18 in a recess completely surrounding the cap 20, and a train of trucks 48, five shown in FIG. 3 riding on the track and each adapted to receive a cartridge magazine 50 which may be filled with spent or fresh cartridges as the case may be. In the operation of the system, as later described in greater detail, a truck 48 while positioned opposite a fuelling passage 52 receives a magazine 50 filled with fresh fuel cartridges from the input-output conveyor system A. The handling machine 40 of handling system C picks up the magazine from the truck, moves into servicing position with respect to a fuel channel, exchanges the fresh cartridges for spent fuel cartridges extracted from the fuel channel of the reactor core, and replaces the magazine, now full of spent fuel cartridges, on the same (or another) truck. At a later time the magazine filled with spent cartridges is removed from the truck, while again positioned opposite to the fuelling passage, by the input-output conveyor system A. The above operations are performed in a cyclic sequence such that a magazine full of spent fuel cartridges is made to remain a prescribed period of time on a truck 48 in chamber 18 before being removed from the chamber by the system A, so that a substantial portion of the radioactivity of the cartridges (as well as its heat content) is dissipated within the chamber, thus greatly facilitating subsequent handling operations.

Figure 4:
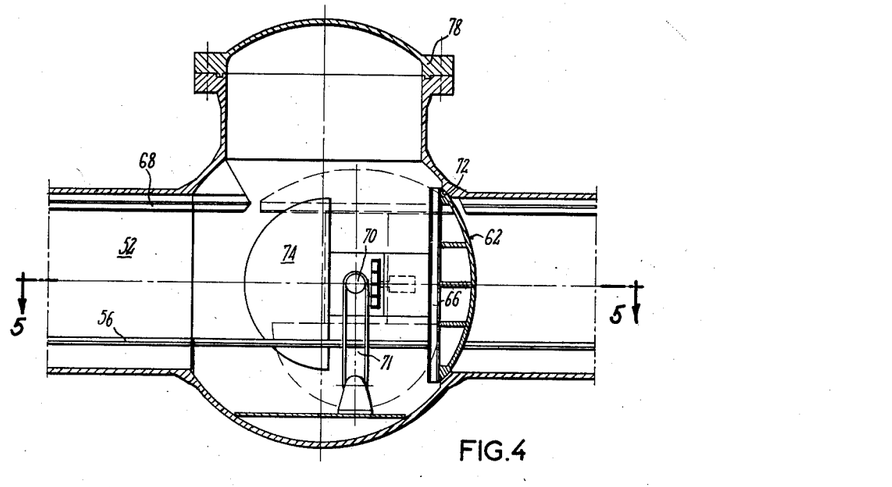
FIG. 4 is a vertical sectional view, on line 4—4 of of FIG. 5, showing one of the lock chambers illustrated in FIGS. 2 and 3 on a larger scale than in the latter figures.
Figure 5:
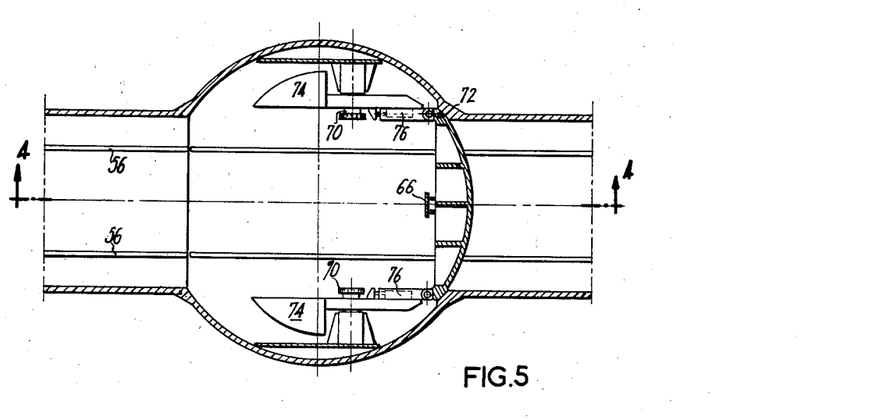
FIG. 5 is a horizontal section of the lock chamber, on line 5—5 of FIG. 4.

Returning to the input-output conveyor system A, this includes a straight two-rail track 56 extending along the floor of tunnel 52 and supporting a gantry 54, later described in detail, adapted to carry a cartridge magazine 50 for delivery to and removal from a truck 48. The radially outer end of passage 52 connects with a vertical elevator shaft 60 containing an elevator cage 126 for delivery and discharge of fuel as later described. The elevator shaft 60 is at atmospheric pressure, and a pressure lock arrangement is accordingly provided in the passage 52 to enable transfer of the fuel magazines 50 between the ends of the passage while maintaining the excess pressure in chamber 18 over atmospheric. The lock comprises a pair of similar lock chambers serially disposed in the passage 52, the lock chambers being formed by generally spherical enlargements in the shell of passage 52, and each chamber having a lock door, 62 and 64 respectively, in the form of a part-spherical member provided with the stiffeners rotatable about a horizontal axis transverse to the length of the passage, between a position where the door extends across the chamber to seal the passage and a position where the door is rotated upwardly to clear the passage. In FIGS. 2 and 3, the door 62 of the inner lock chamber is shown in its upper, open, position, and the door 64 of the outer lock chamber in its sealing position. FIGS. 4 and 5 illustrate the construction of a lock chamber in greater detail, with the door 62 being there shown in its sealing position. It will be seen that the part-spherical door member 62 is supported through a pair of side arms, by way of pressure-fluid rams 76 serving a purpose presently described, for rotation about a pair of aligned trunnions 70 supported on uprights 71 at the opposite sides of the lock chamber. Counterweights 74 mounted on extensions of the supporting arms serve to facilitate rotation of the door member 62 about the axis of trunnions 70, such rotation being effected by a suitable motor not shown. Secured to the center of the inner surface of the door member 62 is a straight track segment 66 which, in the open position of the door, shown in broken lines in FIG. 4, constitutes an extension of the upper monorail track 45 extending along the ceiling of passage 52, which monorail track includes the previously mentioned track 45, another track segment 68 extending between the lock chambers, the tracks 66 carried by the doors 62 and 64 of the respective lock chambers, and a final outermost track segment in the passage 52 connecting with the elevator shaft. Thus a continuous path can be provided for the transfer of a service manipulator from the elevator to the fuelling chamber as later described.

The shell of each lock chamber has part-spherical bearing areas 72 formed in its inner surface for cooperation with complementary machined bearing surfaces of the door member. In the closed position of the lock door, as shown in full lines in FIGS. 4 and 5, the rams 76 can be expanded to apply the door member into firm sealing engagement with the shell at the bearing areas 72. Before the door member 62 is rotated to its open position, the rams 76 are retracted slightly to separate the door bearing surfaces from the shell surfaces.

The top of the shell defining each lock chamber is formed with a manhole, as shown in FIGS. 2 and 4, over which a cover 78 is normally secured. At position directly overlying the manholes, the concrete shield 58 is formed with stepped apertures normally sealed with superimposd stepped concrete slabs 80 (FIG. 2). This arrangment permits access to the tunnel from above in case of a malfunction in the lock system, after reactor shutdown.

Figure 6:
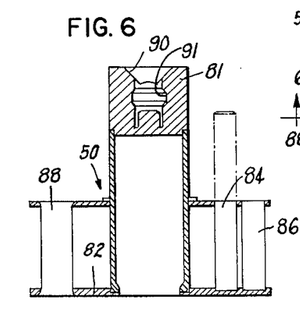
FIG. 6 is a large-scale view of a cartridge magazine, on line 6—6 of FIG. 7.
Figure 7:
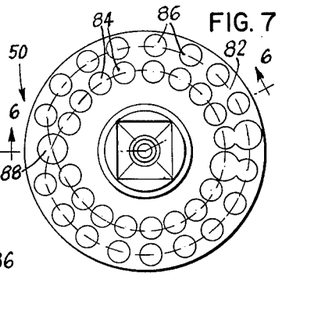
FIG. 7 is an overhead plan view of the cartridge magazine.

One example of a cartridge magazine 50 suitable for use with the system of the invention is illustrated in FIGS. 6 and 7, and is identical with the magazine disclosed in the abovementioned co-pending patent application Serial No. 257,893 which may be referred to for a fuller description. The magazine shown comprises a central cylindrical tubular body 81 with a pair of parallel spaced plates 82 projecting in transverse planes from it near its lower end. The upper plate 82 is formed with a series of circular holes in which are inserted tubular sleeves extending down to the lower plate and providing a series of open-topped sockets 84 and 86, each adapted to contain a fuel cartridge (or other element to be inserted in a fuel channel of the reactor). The centers of these sockets are spaced along a continuous closed curve forming two (or more) internested loops as shown in FIG. 7. The socket 88 having its centre positioned at the crossover point between the loops of the curve is open-bottomed, and provides a through-passage which, in the operative position of the cartridge magazine 50, directly overlies a charge duct 24 and a fuel channel of the reactor core, and serves for the insertion and withdrawal of fuel cartridges into and out of the channel. The central body 81 at its upper end is formed with a frusto-pyramidal (or other polygonal) recess 90 followed by an internal groove 91, for the support of the cartridge in correctly centred and angularly-oriented relation from the central grab of the handling unit 40 as will presently appear.

Figure 8:
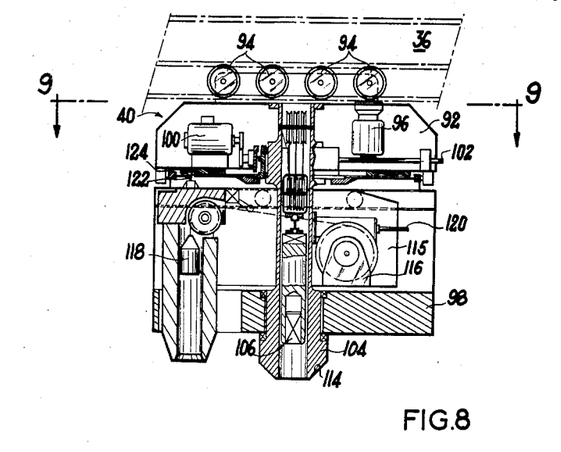
FIG. 8 is a vertical view of the handling unit shown in FIG. 1, on an enlarged scale, and in section on line 8—8 of FIG. 9.
Figure 9:
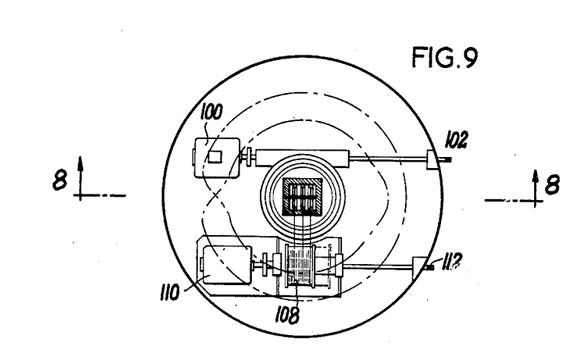
FIG. 9 is a horizontal view of the handling unit, on line 9—9 of FIG. 8.

The fuel handling unit 40 illustrated in FIGS. 8 and 9 is shown identical with the fuel handling machine disclosed in the afore-mentioned copending patent application and will be only summarily described herein. The machine 40 comprises a frame 92 fitted at its top with rollers 94 riding on the rotatable monorail track 36 to permit radial displacement of the unit 40 in chamber 18, through operation of an electric motor 96 supported on the frame 92 and operating through any suitable drive, e.g. of the rack and gear type.

Centrally the frame 92 is provided with a downwardly-projecting hub or nose 104 formed with a frusto-pyramidal end 114 complementary to the recess 90 on the magazine 50. The frame 92 and hub 104 are formed with a vertical axial passage in which a grab 106 is movable, being suspended from a hoist mounted at the top of the frame 92 and operated by means of a winch 108 driven by a motor 110 and positionable manually by means of an extension drive-fitting 112. Thus, with the handling unit positioned above a magazine 50, the grab 106 can be lowered until a conventional claw arrangement of it (not shown) engages the groove 91 in the magazine, and then raised again to fit the frusto-pyramidal recess 90 of the magazine around the nose 114, thereby locking the magazine immovably in a predetermined angular position with respect to the frame 92 of the handling machine 40. Rotatably mounted at the base of frame 92 around the hub 104 is a turntable 98 which can be rotated about its vertical center axis from a motor 100 mounted on frame 92, through a step-by-step arrangement and a worm-and-gear drive. The turntable can also be positioned manually by means of an extension shaft provided with a square drive fitting 102 at its projecting end. Radially movable in a radial slot of the turntable 98 is a vertical guide in which a lateral grab 118 is movable, being suspended by way of a cable trained around a guide pulley from a hoist 116, supported together with said guide on a carriage 115 which is movable on a radial guideway formed on the turntable 98. Hoist 116 is driven from a motor, not shown, mounted on carriage 115, and is manually positionable by means of an extension drive fitting 120. Projecting upwardly from an upper part of the turntable 98 is a follower finger 122 which engages a camway or guide groove 124 formed on a downwardly directed surface of frame 92, and which is congruent with the previously-mentioned two-looped curve along which the centers of the sockets in magazine 50 are positioned. Thus, when a magazine 50 has been immovably fitted to the frame 92 of the handling unit by means of central grab 106 in the manner described higher up, the turntable 98 can be rotated through motor 100 in a step-by-step manner until the radius of turntable 98 on which the carriage 115 is displaceable coincides with a radius of the magazine 50 on which the center of a particular, selected cartridge socket is positioned. In this movement, owing to the congruence between the guide groove 124 and the curve on which the centers of the sockets are positioned in the magazine, the carrier 115 is displaced radially of the turntable by the amount required to cause the axis of grab 118 to coincide with the center of the selected socket. In an initial position of the turntable, the arrangement is such that the axis of grab 118 coincides with the axis of the through-passage 88 in the magazine. It will be understood that with this arrangement, it is possible to operate the handling unit 40 to lower the side grab 118 through magazine passage 88 and a charge duct 24 into a fuel channel of the reactor core with respect to which the unit 40 has been suitably positioned, extract a spent fuel cartridge from said channel, transfer the cartridge into a selected empty socket of the magazine 50, repeat the operation until the fuel channel being serviced has been emptied, then remove a fresh fuel cartridge by means of grab 118 from another socket of the magazine 50, insert this fresh cartridge into the same fuel channel, and repeat this operation until the fuel channel has been re-charged with its complement of fresh fuel cartridges. As a result of this re-fuelling operation, or of more than one such operation, e.g. re-fuelling of two distinct fuel channels of the reactor, the magazine 50, which previously contained a load of fresh fuel cartridges, now contains a load of spent fuel cartridges.

The above explains the manner in which the handling unit 40 is used to transfer spent and fresh fuel cartridges between the reactor core and a truck 48 of the intermediate storage system B.

Figure 10:
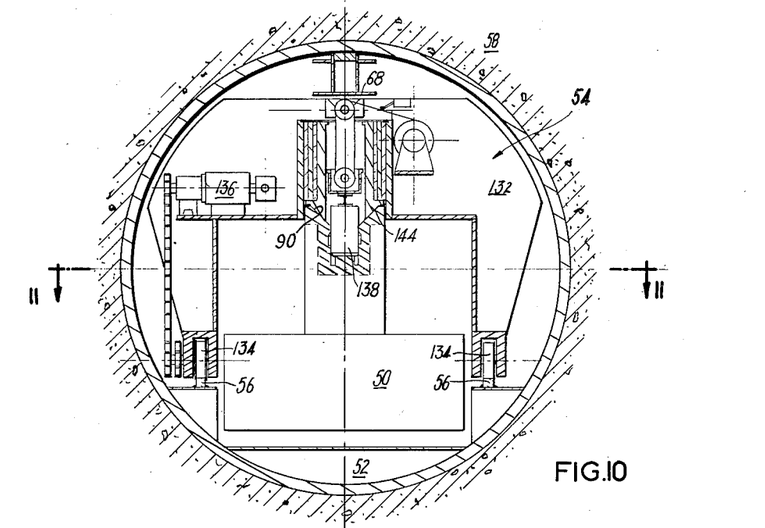
FIG. 10 is a large-scale vertical view of a fuel conveying gantry, in section on a transverse plane of the fuelling tunnel, on line 10—10 of FIG. 11.
Figure 11:
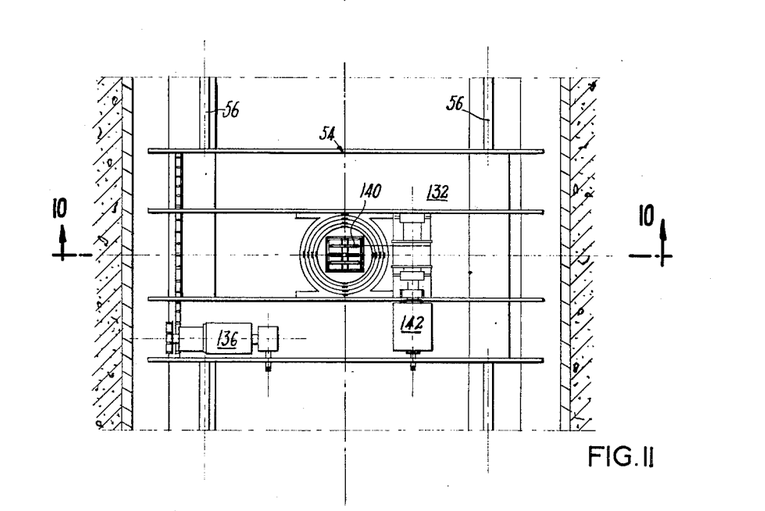
FIG. 11 is an overhead plan view of the gantry, with the tunnel shown in horizontal section on line 11—11 of FIG. 10.

The gantry 54 serving to convey the fuel magazines between an intermediate storage truck 48 and the lift cage 126 through passage 52, is illustrated in FIGS. 10 and 11 as comprising a frame 132 supported on rollers 134 riding the track 56. The rollers are sufficient in number to enable the gantry to pass smoothly over the gaps present in the track, as in the area of each of the lock chambers. Movement of the gantry over the track is effected by an electric motor 136 mounted on the frame and operating a suitable rack-and-gear drive system or equivalent drive means. It will be noted that the frame 132 of the gantry preferably comprises a plurality of parallel, spaced, transverse shielding walls conforming rather closely to the inner contour of the shell of passage 52. Supported centrally of the gantry is a hoist 140 driven from an electric motor 142 and operating a grab 138 similar to the central grab 106 of the handling unit 40 to be engageable with the groove 91 in the magazine 50. The grab 138 is movable in a vertical tube 144 which terminates at its base in a frusto-pyramidal nose 144 complementary to the recess 90 in the magazine and serving a similar purpose to the nose 114 of the handling unit 40, i.e. to lock a magazine immovably with respect to the frame of the gentry 54 in a prescribed position.

The cage 126 movable in elevator shaft 60 is two-decked for reasons that will appear. The lower deck is fitted with a track segment 131 alignable with the track 56 of the passage 52 to receive the gantry 54 in the cage. The cage 126 is operated from a hoist 128 mounted on top of the shield 58, with the hoist cable being passed through the upper wall of the shield by means of an angled passage provided with a guide pulley 130 to reduce radiation leakage through the passage.

The operation of the system for an on-load refuelling process will now be described with special reference to FIG. 12, wherein the different views illustrate the successive stages involved in introducing a magazine loaded with fresh fuel cartridges through the passage 52 into the refuelling chamber 18, filling the fresh cartridges into a fuel channel of the reactor and exchanging them for spent cartridges removed from the channel; and discharging the magazine now loaded with spent fuel cartridges through the passage. The arrows in the various views suggest the directions of movement of the components.

Figure 12:
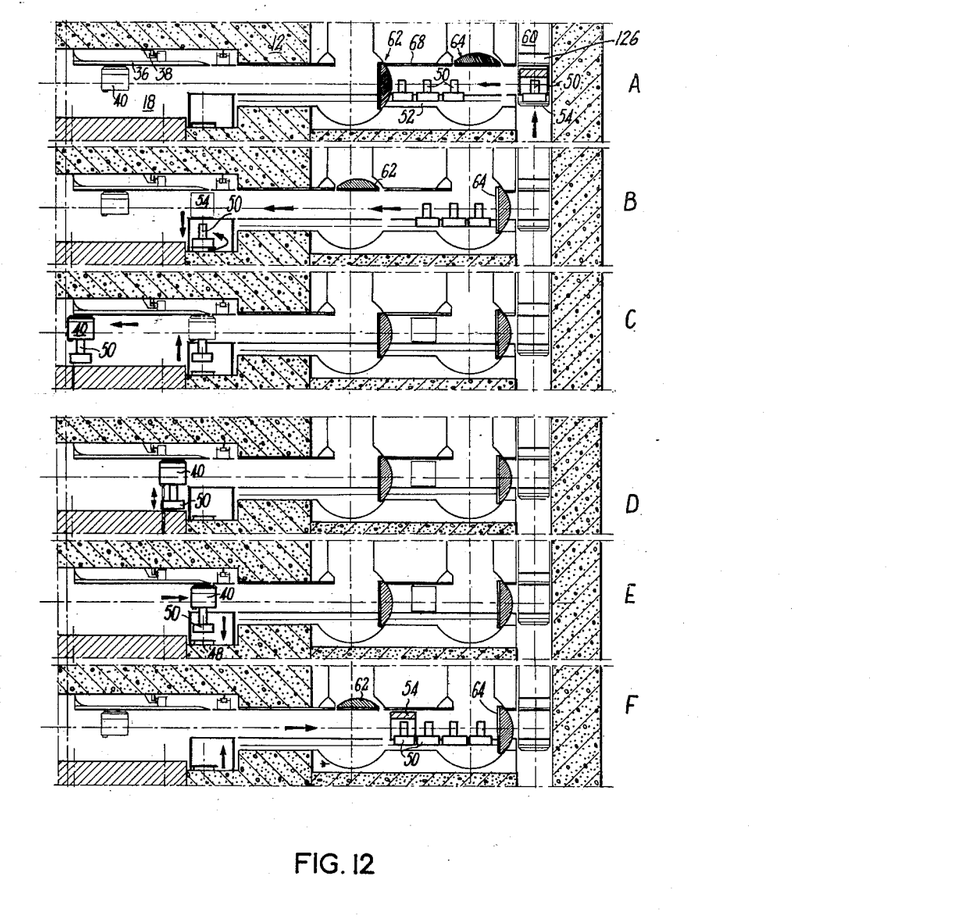
FIG. 12 is a set of small-scale views schematically illustrating stages of a fuelling cycle performed with the system of the invention.

In FIG. 12A, three magazines 50 are shown entering the lock from the elevator cage. Lock door 64 is open and door 62 closed. The elevator cage 126 containing a freshly loaded cartridge magazine 50 has been raised to the level of the passage so that its track segment 131 is aligned with the track 56. The gantry 54 is backed over these tracks into the elevator cage to overlie the magazine 50, is operated to lift the magazine by means of grab 138, then is advanced back into the lock and deposits the magazine between the lock chambers. After a requisite number of magazines, e.g. the four shown in FIGS. 2 and 3, have thus been disposed between the lock chambers, lock door 64 is closed, the lock is pressurized, lock door 62 is opened, and the gantry 54 is operated to pick up the magazines 50 one after the other and deposit them onto respective trucks 48 of the intermediate storage station. The train of trucks 48 is advanced around the circular track successively to bring each truck in front of the outlet of passage 52. FIG. 12B shows the gantry depositing a cartridge magazine 50 onto a truck 48.

It is important to note that during the operations so far described for the transfer of the cartridge magazines from the elevator to the intermediate storage trucks, the magazines 50 are each retained with a constant angular orientation in space, as imparted thereto on insertion into the elevator cage 126, owing to the interfitting relation between the polygonal recess 90 of the magazine and the complementary nose 144 of the gantry. In fact, any slight error in the correct angular position of a magazine will be corrected due to said polygonal fit.

In FIG. 12C, a magazine 50 is shown being picked up by the handling unit 40 from a truck 48 and then carried to a position overlying a fuel channel to be refuelled; the arrows indicate the magazine movements involved. The handling unit 40 is operated to exchange the fresh cartridge in the magazine 50 for spent ones withdrawn from the fuel channel, as previously described. During these operations the fixed orientation of the magazine is again maintained, this time owing to the interfitting of the magazine recess 90 with the nose 114 of the handling unit 40, and it will now be understood that the said orientation is such as to ensure the aforementioned congruence between the curve on which lie the centers of the cartridge sockets in magazine 50, and the guide groove 124 of the handling unit, as well as the register of the through-passage 88 of the magazine with the charge duct 24 of the channel being fuelled.

While the details of a fuelling cycle may be varied ad libitum, it is here assumed that the fuelling cycle is similar to that described in detail in the co-pending patent application earlier identified, wherein each magazine 50 can serve for two fuel channels of the reactor without re-loading. Accordingly, FIG. 12D shows the handling unit 40 re-positioned in servicing relation to a further fuel channel of the reactor, in which position the same operations as above are performed to exchange the spent cartridges in the channel for fresh cartridges taken from the magazine. The complement of fresh fuel cartridges in the magazine is now exhausted, and the unit 40 is operated to deposit the magazine on a truck 48 of the intermediate storage system (see FIG. 12E), where it is allowed to remain a sufficient time to dissipate a major amount of the radioactivity, and also the heat content, of the spent cartridges. The temperature of the pressure gas supplied to the fuelling chamber 18 is low enough to dispense with the provision of forced cooling of the spent cartridges.

Eventually, the truck 48 carrying the magazine under consideration is brought to a position at the outlet of passage 52 and the gantry 54 is operated to convey the magazine from the truck into the elevator cage 126 in a sequence of steps reverse from those described above for the delivery of the freshly loaded magazine, so that further description is unnecessary. FIG. 12F illustrates this stage of the procedure.

It will be appreciated from the above description, that in accordance with a major advantage of the invention, the operating steps involved in the input of the freshly loaded magazines into the servicing chamber 18 (as shown especially in FIGS. 12A and B) and in the output of the magazines filled with spent fuel cartridges from said chamber (FIG. 12F) are substantially independent of the steps involved in the charging and discharging of the fuel cartridges into and out of the reactor channels. The input and output steps involve only the systems A and B, and the only condition requisite for their performance is the presence of a truck 48 at the mouth of the passage 52. The fuelling steps involve only the systems B and C, and do not require fulfilment of any particular conditions as to the placement of the intermediate storage trucks 48, since the handling unit 40 is able to pick up a magazine from a truck wherever placed, use the magazine to refuel any one or more of the fuel channels of the reactor, and then deposit the magazine with its load of spent fuel on the truck even if it has been moved to another position meantime, or on another truck. This greatly increases the flexibility of the reactor-servicing processes permitting the handling system C and input-output conveyor system A to function simultaneously when desired, and correspondingly increases the operating rate while saving equipment.

It is intended that the handling system described, while being primarily used for refuelling, shall also serve where desired, for introducing and removing into and from the interior of the reactor shield any parts, instruments, samples, etc., that may be required, provided their operating position in the reactor is accessible from the servicing chamber 18. In this respect, the system is especially valuable for carrying out routine and/or emergency maintenance operations without requiring reactor shutdown. By way of example of this aspect of the invention, the operation of the installation will be described with reference to FIG. 13 for removing a defective handling unit 40 and replacing it with a spare unit.

A manipulator 150 of any conventional type suitable for remote control, is placed in the lower compartment of the double-deck cage 126. The manipulator is supported on a carrier suspended from an overhead monorail (not shown) in the cage 126, adapted for alignment with the monorail 68 in the passage 52. The manipulator 150 is suitably fitted with a television camera, not shown, capable of following the movements of the prehensile member of the manipulator.

Figure 13:
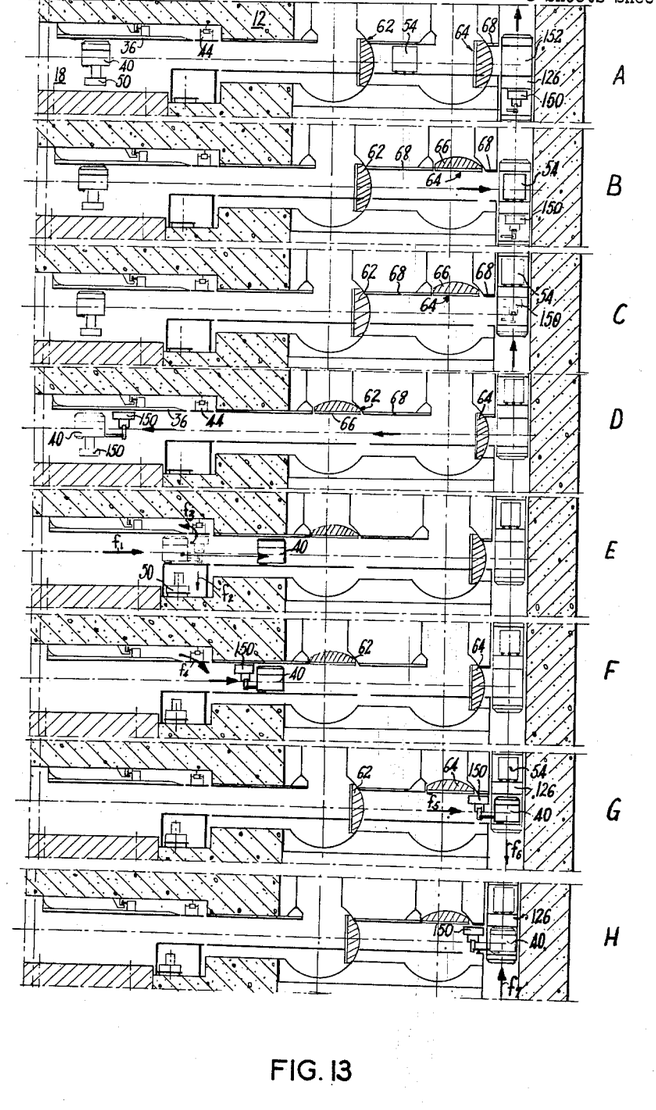
FIG. 13 is a similar series of views illustrating the stages of a servicing cycle, involving replacement of a defective handling unit by a spare.

The elevator cage is brought to the position shown in FIG. 13A, in which the upper compartment 152 of the cage is facing the tunnel inlet. The gantry 54 is backed from the fuelling chamber 18 into the lock. The lock is drained to atmospheric pressure and the gantry 54 is driven into the elevator compartment 152 (FIG. 13B). At this time, the plug connector serving to supply electric power to the motors of the gantry, which normally is plugged into a power outlet within the lock, is disconnected. The elevator cage is raised to bring its lower deck on a level with the tunnel floor, as shown in FIG. 13C, and the manipulator 150 is connected by way of its connector cable to the power outlet in the lock, so that it now becomes independently operative. It may be noted that while the above-noted disconnecting and connecting operations can easily be provided for automatically, they can also be manually performed if desired since with certain usual precautions a human operator can well enter the elevator and the lock for the short time required to perform them.

The manipulator carriage is now moved over the monorail tracks 68 and 66 to introduce the manipulator into the lock, the lock door 64 is closed, the lock is pressurized, and door 62 opened, and the manipulator is advanced by way of monorail 66 and rotatable monorail section 44 on to the rotatable monorail 36 carrying the defective handling machine 40. This position of the manipulator 150 is shown in FIG. 13D, where the manipulator movements are suggested by the arrows. The manipulator is then remotely operated to disconnect the power from the handling unit 40, and if necessary actuate the manual driver fittings 102 and 120 in order to terminate a fuelling operation that may have been interrupted by the malfunctioning of the defective handling unit. The manipulator is operated to convey the unit 40 towards the outer end of the radial arm 36, overlying an empty one of trucks 48. This displacement may be effected either by causing the manipulator to pull the unit 40 attached to it, or the unit 40 may be moved under its own power by motor 96 if operative. This movement of unit 40 is indicated by arrow $f_1$ in FIG. 13E. The manipulator is made to actuate manual driver 112 to operate the central hoist so as to deposit the magazine 50 as indicated by arrow $f_2$ in FIG. 13E. Operations can be visually monitored by means of the central periscope in chamber 18, and/or the television cameras provided. The carriage carrying manipulator 150 and monorail section 44 are then displaced angularly along rail 42 by an amount sufficient to provide a clear passage for the unit 40 (as indicated by arrow $f_3$). The manipulator is made to push the unit 40 laterally off radial monorail 36 on to monorail track 45; the unit 40 is fitted with a sufficient number of rollers 94 to cross the intervening gap smoothly. The manipulator carrier is then returned to its previous angular position, and passed from monorail section 44 to monorail 45, being now positioned behind the unit 40, i.e. in pushing relation to it.

The manipulator, following unit 40, travels over the path indicated by arrows $f_4$ in FIG. 13F, pushing the unit 40 into the lock. Door 62 is operated to close the lock and pressure equilibrium is established between the lock and atmosphere. Door 64 is opened (FIG. 13G), and the manipulator 150 caused to push the unit 40 into the cage 126 (arrow $f_5$ in FIG. 13G). The elevator cage is lowered (arrow $f_6$), the defective handling unit removed from it and a spare unit 40' introduced instead. The elevator cage is raised (arrow $f_7$, FIG. 13H) to the tunnel level and the manipulator 150 is operated to pull the replacement unit 40' into the lock.

Succeeding operations will be obvious and do not require detailed description since they are substantially the reverse of the operations involved in removing the defective handling machine. In brief, the manipulator conveys the unit 40' to the same radial arm 36 from which the defective unit 40 was removed, connects the unit 40' to the power source, and is returned into the lower compartment of the elevator cage. The cage is lowered to place the upper compartment 152 at tunnel level. The gantry 54 is re-connected to the power source and returned into the lock.

It will be evident that various modifications may be made in the structure described and shown without departing from the scope of the invention. The operating procedures and sequences can also be modified in a great many ways. As a minor example, matters can be so arranged that the defective unit 40 (or other apparatus to be removed from the servicing chamber) can be hauled the whole way from the chamber into the elevator cage, rather than being first hauled and then pushed. This will simply require a corresponding increase in the dimension of cage 126 parallel to the passage 52, and the use of two manipulators instead of one. The intermediate storage system B of the invention, instead of comprising a circular track and trucks running thereon, may in a simplified version of the invention be reduced to mere storage locations, transfer of the magazines between such locations and the gantry being then performed by the agency of the handling unit 40.

As already noted, the provision of the intermediate or temporary storage station B between the input-output conveyor system A and the charging system C, makes possible the simultaneous and independent operation of the two systems A and C, thereby greatly increasing the flexibility and speed of fuelling operations. The provision of said intermediate storage further allows the spent fuel elements to be kept within the servicing chamber inside the reactor shield for a time long enough to ensure dissipation of a major portion of their radioactivity, as well as their natural cooling, so that subsequent processing of said elements is considerably facilitated.

General servicing of the reactor for routine and emergency operations is greatly facilitated by the system. The provision of a servicing chamber shielded from the reactor core chamber and wherein a positive pressure differential can be maintained with respect to the latter chamber, further facilitates such servicing and maintenance in that it minimizes radio-active contamination of the fuelling apparatus and permits ingress of an operator into said fuelling chamber after shutdown of the reactor.

What we claim is:

1. A nuclear reactor comprising a core with parallel spaced fuel channels therein; a shield surrounding the core; a servicing chamber defined in the shield and means providing communication for fuel between said chamber and corresponding ends of said channels; a fuel handling unit in said chamber and means for positioning the unit in servicing relation to a selected channel for insertion and withdrawal of fresh and spent nuclear fuel into and out of said channel; means for conveying fresh and spent fuel into and out of said chamber through the shield; intermediate storage means in the servicing chamber; means for transferring fresh and spent fuel between said conveying means and said storage means; and means on said handling unit for transferring fresh and spent fuel between said unit and said storage means, said storage means being capable of storing an amount of fuel greater than the amount conveyable at one time by said conveying means.

2. A nuclear reactor comprising a core with parallel spaced fuel channels each adapted to receive a complement of nuclear fuel cartridges stacked therein; a shield surrounding the core; a servicing chamber defined in the shield and means providing communication for fuel cartridges between said chamber and corresponding ends of the channels; a fuel handling unit in said chamber and means for positioning the unit in servicing relation to a selected channel for insertion and withdrawal of fresh and spent cartridges into and out of said channel; a plurality of fuel magazines each adapted for loading with at least one complement of fresh fuel cartridges and at least one complement of spent fuel cartridges; means for conveying loaded magazines into and out of said chamber through the shield; intermediate storage means in the chamber capable of storing a number of loaded magazines; means for transferring loaded magazines between the conveying means and the storage means; and means on said handling unit for transferring loaded magazines between said unit and said storage means.

3. A nuclear reactor comprising a shield; a main chamber in the shield; a reactor core in the main chamber having vertical fuel channels spaced therein each adapted to receive a complement of stacked fuel cartridges; a servicing chamber in the shield in vertical alignment with the main chamber; a shielding partition between the main chamber and servicing chamber; sealable ducts through the partition for providing communication for fuel cartridges between the servicing chamber and corresponding ends of the channels; a fuel handling unit in the servicing chamber; means for positioning the unit radially and circumferentially of the chamber into servicing relation with a selected channel for insertion and withdrawal of cartridges into and from said channel; a plurality of fuel magazines each adapted for loading with fuel cartridges; means for conveying loaded magazines into and out of said servicing chamber through the shield; a number of movable storage means; means for moving said storage means over a circumferential path in the servicing chamber around the core; means for transferring loaded magazines between said conveying means and any one of said storage means when said one storage means is positioned at one point of said path, and means on said unit for transferring magazines between said unit and any one of said storage means when said last named one of said storage means is positioned within at least a predetermined segment of said circumferential path.

4. The nuclear reactor claimed in claim 3, wherein said storage means comprise a number of trucks movable over a circumferential track in said servicing chamber.

5. The reactor claimed in claim 3, wherein said magazine comprises a set of fresh-cartridge locations and a set of spent-cartridge locations, each set capable of holding at least one said full complement of cartridges, said locations disposed with their centres spaced along a predetermined curve; cartridge-gripping means on said unit and means for displacing said gripping means with respect to said unit over a path congruent with said curve; locating means on said unit and each magazine interengageable for blocking a magazine with respect to the unit in a predetermined relative position wherein said congruent curve and path are in mutually corresponding positions, whereby with said unit positioned in serving relation to a selected channel, said cartridge gripping means will be operable to transfer spent cartridge sequentially from a channel to said spent-cartridge locations of said magazine and fresh cartridge sequentially from said fresh-cartridge locations of the magazine into the channel.

6. A nuclear reactor comprising a shield; a main chamber in the shield; a reactor core in the main chamber having vertical fuel channels spaced therein each adapted to receive a complement of stacked fuel cartridges; a servicing chamber in the shield in vertical alignment with the main chamber; a shielding partition between the chambers and sealable ducts through the partition providing communication for cartridges between the servicing chamber and corresponding ends of the channels; means for circulating a coolant gas under pressure through said chambers and channels and including means for maintaining a substantially higher pressure in said servicing than in said main chamber; a fuel handling unit in said servicing chamber and means for positioning the unit in servicing relation with a selected channel for insertion and withdrawal of fuel cartridges into and from said channel through a related duct at least one passage through said shield connecting with said servicing chamber, and a pressure lock in said passage for maintaining said pressure in the servicing chamber; conveyor means for conveying fuel into and from the servicing chamber; through said passage by way of said lock and means for transferring fuel cartridges between said conveyor means and said unit.

7. The reactor claimed in claim 6, wherein said transfer means include intermediate storage means in said chamber, means for transferring cartridges between said conveyor means and said storage means, and means for transferring cartridges between said storage means and said handling unit.

8. The reactor claimed in claim 7, wherein said lock comprises a pair of lock chambers spaced longitudinally of said passage, spherical seating means in said lock chambers, part-spherical lock doors in the respective chambers pivoted on axes extending transversely of said chambers for rotation between sealing positions in which a lock door extends across the chamber to seal the passage and an open position in which the door clears the passage, seating surfaces on said doors registering with said chamber seating surfaces in the sealing position of a door, and pressure-fluid actuators connected with said doors to apply the seating surfaces thereof sealingly against the registering seating surfaces of the chamber in the sealing position of the door.

9. The reactor claimed in claim 7, wherein said fuel conveying means comprise a track extending along said passage, a cartridge carrier movable along said track, a loading station at the end of said passage remote from said servicing chamber, and means on said carrier for transferring cartridges between said loading station and said carrier and between said carrier and said storage means.

10. The reactor claimed in claim 2, wherein said magazine comprises a set of fresh-cartridge locations and a set of spent-cartridge locations each set capable of holding at least one said full complement of cartridges, said locations disposed with their centres spaced along a predetermined curve; cartridge-gripping means on said unit and means for displacing said gripping means with respect to said unit over a path congruent with said curve locating; means on said unit and each magazine interengageable for blocking a magazine with respect to the unit in a predetermined relative position wherein said congruent curve and path are in mutually corresponding positions, whereby with said unit positioned in servicing relation to a selected channel, said cartridge gripping means will be operable to transfer spent cartridge sequentially from a channel to said spent-cartridge locations of said magazine and fresh cartridge sequentially from said fresh-cartridge locations of the magazine into the channel.

11. The reactor claimed in claim 10, wherein said magazine-conveying means comprise a fueling passage extending through the shield and connecting at one end with the servicing chamber, a loading-and-unloading station at the remote end of said passage, a track along said passage, a carrier movable along said track, means on said carrier for transferring a loaded magazine between said station and carrier at said remote end of the passage and for transferring a magazine between said storage means and carrier at said one end of the passage, and locating means on said carrier interengageable with said locating means on each magazine for maintaining a predetermined angular position of said magazine as imparted thereto on loading at said station.

12. The reactor claimed in claim 11, including means for displacing an emergency manipulator between said station and servicing chamber along said passage.

References Cited by the Examiner

UNITED STATES PATENTS 3,066,089    11/62    Davies _________________ 176—30

FOREIGN PATENTS 1,230,954    4/60    France.

CARL D. QUARFORTH, *Primary Examiner.*

REUBEN EPSTEIN, *Examiner.*